United States Patent
Kang et al.

(10) Patent No.: US 6,775,103 B2
(45) Date of Patent: Aug. 10, 2004

(54) SLIDER HEAD HAVING THERMALLY CONTROLLED DISTAL END AND ASSEMBLY WITH A ROTATING DISC

(75) Inventors: Soo-Choon Kang, San Jose, CA (US); Jeffrey S. Lille, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 341 days.

(21) Appl. No.: 09/824,351

(22) Filed: Apr. 2, 2001

(65) Prior Publication Data

US 2002/0141113 A1 Oct. 3, 2002

(51) Int. Cl.$^7$ ............................ G11B 5/60; G11B 15/64
(52) U.S. Cl. .................................. 360/236.5; 360/235.3
(58) Field of Search ............................ 360/236.5, 235.3

(56) References Cited

U.S. PATENT DOCUMENTS

| | | | |
|---|---|---|---|
| 5,021,906 A | 6/1991 | Chang et al. | 360/103 |
| 5,313,352 A | 5/1994 | Chikazawa et al. | 360/103 |
| 5,880,899 A | 3/1999 | Blachek et al. | 360/66 |
| 5,943,189 A | 8/1999 | Boutaghou et al. | 360/103 |
| 5,959,801 A * | 9/1999 | Gillis et al. | 360/75 |
| 5,991,113 A | 11/1999 | Meyer et al. | 360/75 |
| 6,073,337 A * | 6/2000 | Strom | 29/603.12 |

FOREIGN PATENT DOCUMENTS

| | | | |
|---|---|---|---|
| JP | 64-88975 | 4/1989 | |
| JP | 4-355291 | 5/1991 | |
| JP | 5-250832 | 3/1992 | |

* cited by examiner

Primary Examiner—David Davis
(74) Attorney, Agent, or Firm—William N. Hogg; Driggs, Lucas, Brubaker & Hogg Co., LPA

(57) ABSTRACT

A slider head assembly is provided which includes a slider head for reading/writing data on the surface of a rotating disc. The slider head is disposed in spaced relationship with respect to the disc for read/write (R/W) operations. The slider head assembly is comprised of a body portion having an essentially planar surface positioned to co-act with the surface of the disc with a proximal end and a distal end. The proximal end or trailing slider surface of the head assembly has a read/write element thereat. The distal end or leading slider surface of the assembly has an actuation device mounted thereon, having a surface the position of which can be modified by an external signal to change the position of the head with respect to the planar or air bearing surface (ABS) of the head assembly. This will change the characteristics of the boundary layer of air between the rotating disc and the head, causing the head assembly to move closer to or farther from the rotating disc when actuated by the external signal. A preferred embodiment is a patterned heating element which selectively heats the edge of the leading surface of the slider to cause position modification of the device. The invention also contemplates the head assembly in combination with the rotating disc and a method of controlling the height of the head assembly with respect to the rotating disc.

28 Claims, 3 Drawing Sheets

SLIDER HEAD HAVING THERMALLY CONTROLLED DISTAL END AND ASSEMBLY WITH A ROTATING DISC

BACKGROUND OF THE INVENTION

1. Field of the Invention

The present invention relates to a slider assembly for a read/write head in a rotating disc assembly and, more particularly, to a slider head assembly that has a thermally actuated distal end for controlling the height of the slider head with respect to the rotating disc.

2. Background Information

In disc drive applications, it is often desirable to provide a slider assembly with the capability to selectively adjust the position of a head with a read/write (RIW) element in relation to the disc itself. This capability is utilized to load and unload the head over the disc to disengage the head from a read/write position with respect to the disc while flying over the disc, and to dynamically adjust the fly height of the head while reading and/or writing the data to and from the disc.

One solution for on-demand engagement and disengagement of the head involves machining a slot in the proximal end of the slider carrying the head assembly and fastening a piezoelectric stack in the slot, such as by an adhesive. Activating the piezoelectric stack causes the slider to bend, thereby moving the head assembly carried in the slider in proximity with the disc for the read/write operation. However, this solution is not suitable for mass production, making it prohibitively expensive and time consuming for manufacturing in any substantial quantity. Other solutions also have significant drawbacks such as an inability to scale with decreased slider dimensions.

Thus, there is a need for a head assembly to provide selective engagement and disengagement of a read/write head in proximity with a disc but can be easily actuated to control the height of the head assembly over the disc.

SUMMARY OF THE INVENTION

According to the present invention, a slider head assembly is provided which includes a slider head for reading/writing data on the surface of a rotating disc. The slider head is disposed in spaced relationship with respect to the disc for read/write (R/W) operations. The slider head assembly is comprised of a body portion having an essentially planar surface positioned to co-act with the surface of the disc with a proximal end and a distal end. The proximal end or trailing slider surface of the head assembly has a read/write element thereat. The distal end or leading slider surface of the assembly has an actuation device mounted thereon, having a surface the position of which can be modified by an external signal to change the position of the head with respect to the planar or air bearing surface (ABS) of the head assembly. This will change the characteristics of the boundary layer of air between the rotating disc and the head, causing the head assembly to move closer to or farther from the rotating disc when actuated by the external signal. A preferred embodiment is a patterned heating element which selectively heats the edge of the leading surface of the slider to cause position modification of the device. The invention also contemplates the head assembly in combination with the rotating disc and a method of controlling the height of the head assembly with respect to the rotating disc.

DESCRIPTION OF THE PREFERRED EMBODIMENTS

Figure 1:
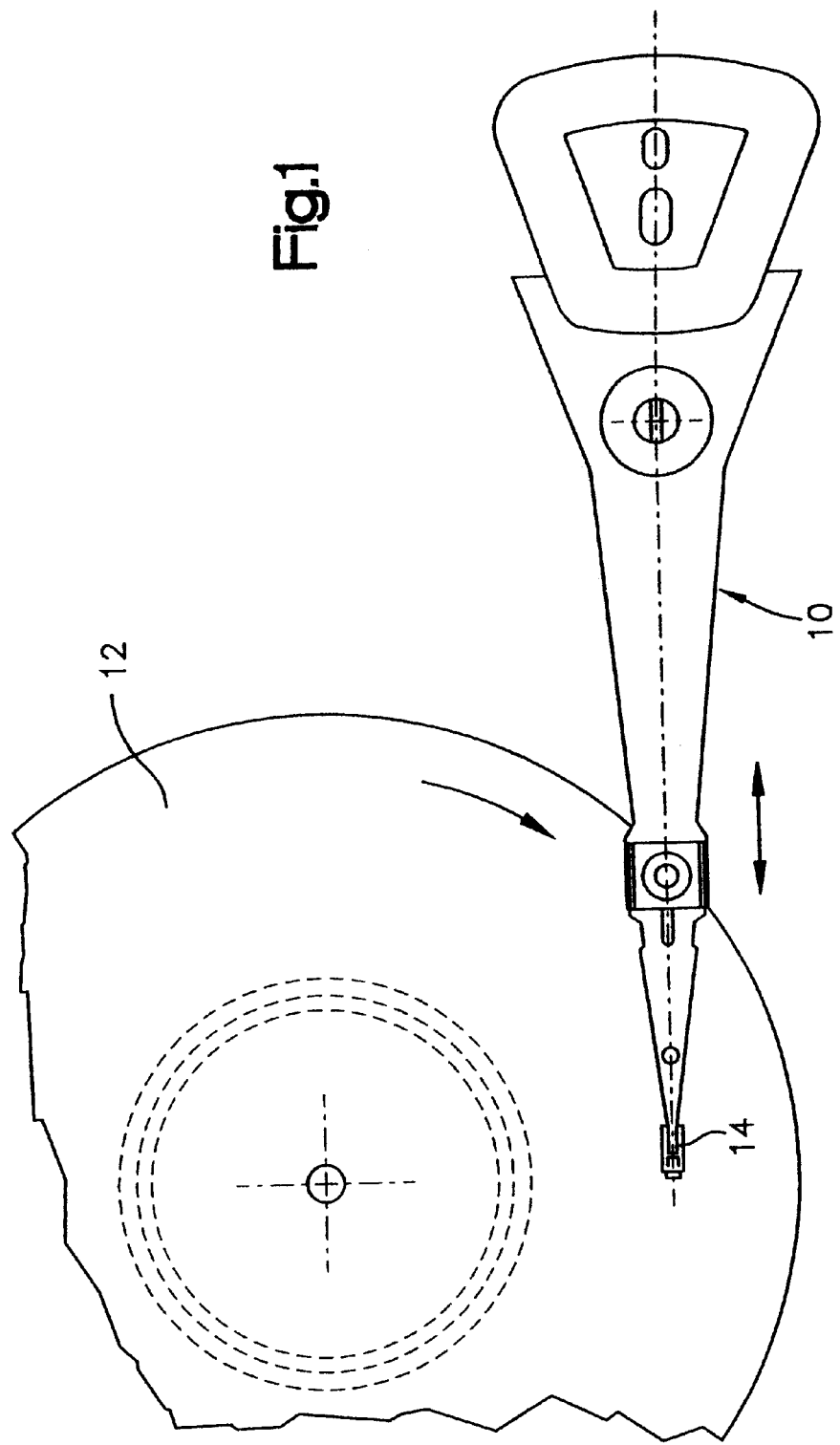
FIG. 1 is a top plan view of a disc drive system for supporting a slider over the surface of a disc.

Referring now to the drawings and, for the present, to FIG. 1, a slider arm assembly 10 is shown somewhat diagrammatically in normal operating position over a disc 12. The slider arm assembly 10 includes a head assembly 14. The slider arm assembly 10 is adapted to move radially with respect to top surface 16 of the disc 12, while the disc 12 rotates to allow the head assembly 14 to read and write materials from the disc assembly in a well known manner. The slider arm assembly 10 also allows the head assembly 14 to move macro distance to a new read/write position. The position of the R/W head for this macro movement is sometimes referred to herein as the fly position. This movement to a new position typically requires the head assembly 14 to be spaced farther from the disc 12 than it is in the read/write (R/W) position.

One embodiment of the head assembly 14 for reading and writing (R/W) information and movement to different R/W positions is shown in FIGS. 2 through 6. The head assembly 14 includes a body member 20 having a bottom planar surface 22, a proximal end 24 and a distal end 26. The body 20 is preferably formed of a material known as N-58 which is approximately 70% aluminum oxide ($Al_2O_3$) and 30% titanium carbide (TiC). This has a coefficient of thermal expansion of about $7 \times 10^{-6}$ per °K. However, other materials such as silicon or silicon alloys can be used. Electrically insulating material 28 is mounted on the distal end 26 of the body 20 and has disposed therein an electrical heater 32. Preferably, the heater 32 is a resistance heater of the type shown in FIG. 6. However, other types of heaters such as an inductive heater can be employed. The electrically insulating material 28 can be formed of metal oxides or mixtures of metal oxides, such as $Al_2O_3$ and $SiO_2$ and mixtures thereof or other insulating metal oxides and mixtures thereof. The insulating material 28 has a planar surface 34 thereon which is essentially coplanar with the surface 22 on the body 20. A wire 38 connects the electrical heater 32 to a source of power (not shown). This permits an external signal to be used to activate the heater 32 for height control as will be described presently.

A thermally actuated member 40 is provided which is secured to the insulating material 28. The thermally actuated member preferably is alumina, i.e. $Al_2O_3$, which has a coefficient of thermal expansion of about $8 \times 10^{-6}$ per °K.

However, other materials, such as mica, titanium oxide, or other metal oxides and mixtures of metal oxides, silica, polymers, or combinations thereof can be used for the thermally actuated member 40. The thermally actuated member 40 has a planar surface 42 which is essentially coplanar with the surfaces 34 and 22 when in the ambient or unactuated condition. The body 20 has a read/write element 48 of conventional design disposed at its proximal end 24.

The length from the distal end of the thermally actuated member to the proximal end of the body 20 is about 1000 micrometers; and the length of the member 40 from its distal end to where the insulation material 28 is attached to the body 20 is about 20 to 30 micrometers.

Figure 2:
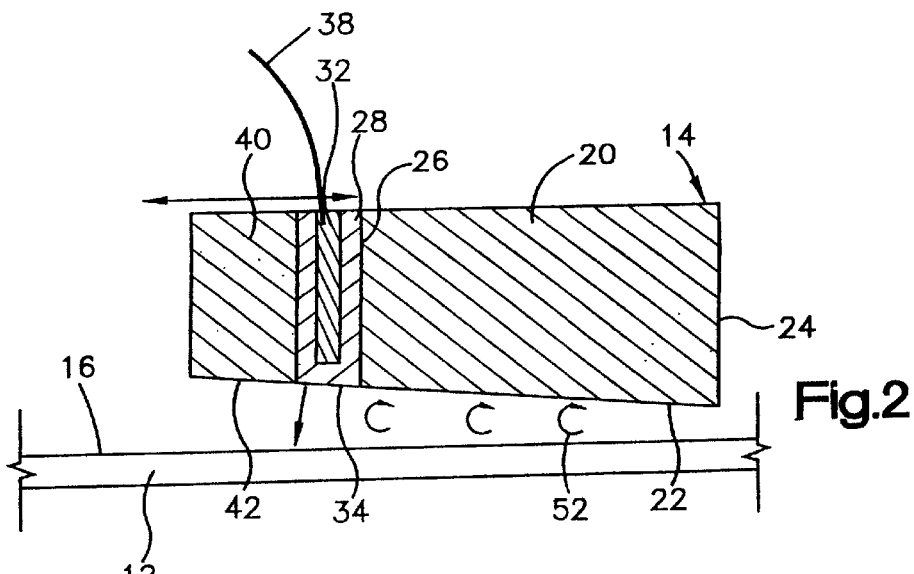
FIG. 2 is a longitudinal, sectional view of one embodiment of a slider head assembly for a disc slider in the unactuated or ambient condition.

As can best be seen in FIG. 2, the head assembly 14 is maintained at an acute angle with respect to the surface 16 of the disc 12 such that the surface 16 of the disc 12 and the head assembly is much closer at the proximal end 24 than at the distal end 26. Indeed, preferably, the spacing of the head assembly 14 at the distal end is greater than about 50 nanometers, and typically less than 100 nanometers whereas, at the proximal end, the spacing is preferably between 5 and 30 nanometers. These spacings are not critical, other than that the head should move closer to the surface 16 of the disc 12 in the R/W position (indeed even contacting the surface 16) than in the fly position.

Figure 3:
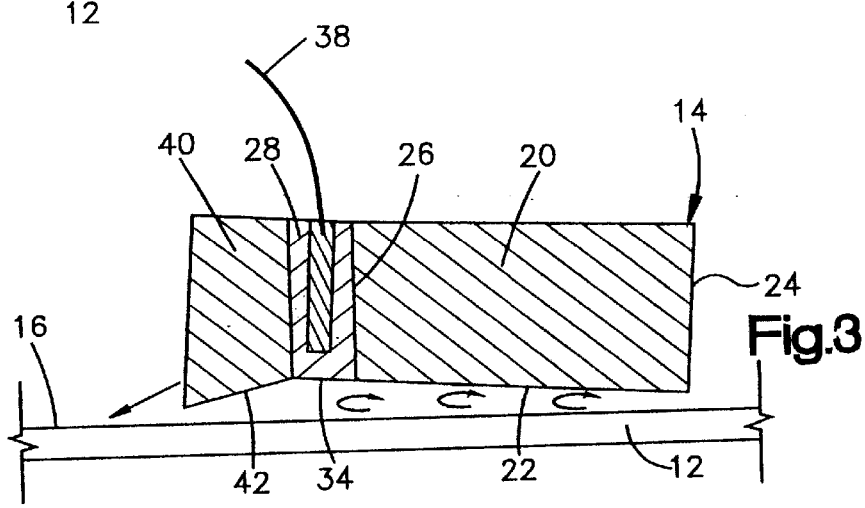
FIG. 3 is a view similar to FIG. 2 with the assembly in the actuated or heated condition.
Figure 4:
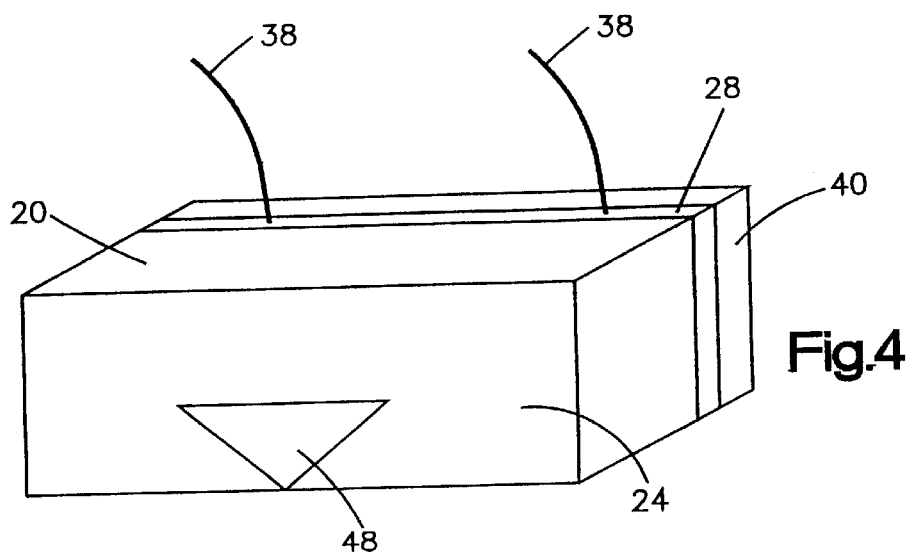
FIG. 4 is a perspective view showing the proximal end of the head assembly of FIGS. 2 and 3 of a slider showing the read/write element.
Figure 5:
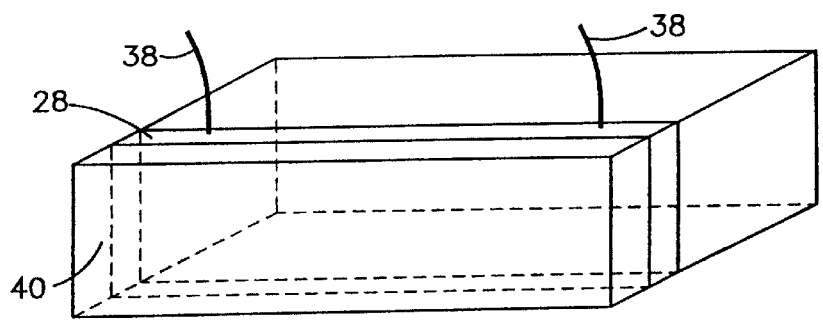
FIG. 5 is a perspective view of the distal end of the head assembly of FIGS. 2 and 3.
Figure 6:
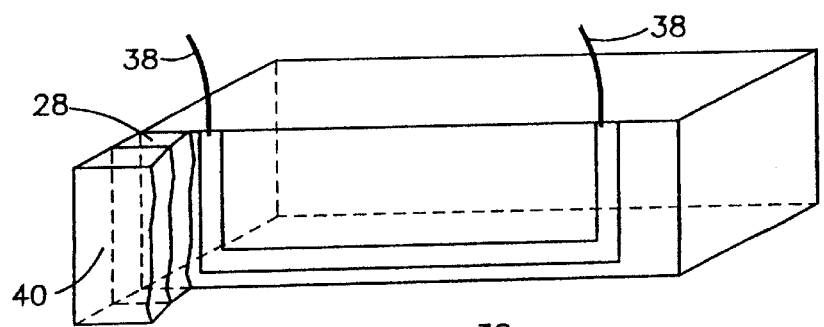
FIG. 6 is a perspective view of the head assembly shown in FIGS. 2 through 5 with parts broken away for clarity.

As the disc 12 rotates, a boundary layer 52 of air is created along the planar surfaces 22, 34 and 42 of the head assembly 14. The action of the air on the boundary layer 52 maintains the head assembly 14 spaced from the surface 16 of the disc 12 an appropriate distance, as will be explained presently. When the thermally actuated member 40 is heated, it will distort or bend downwardly toward the surface 16 of the disc 12, as shown in FIG. 3. This results in an angle of less than 180° between the surface 42 and the surface 22. This distortion or movement preferably is no more than about 20% of the distance between the surface 16 of the disc 12 and the planar surface 42 of the thermally actuated member 40. However, even this amount of movement is enough to disturb the boundary layer 52, which will cause the head assembly 14 to move closer to the surface 16 of the disc 12 up to and including contact with the surface 16. Thus, when the head assembly is being used in a read/write operation, the heater 32 can be turned on, causing it to increase the temperature, thus heating the thermally actuated member 40 and causing the movement of the planar surface 42 thereof.

Since the thermally activated member 40 is significantly thinner and has significantly less mass than the body 20, the member 40 will be raised to a higher temperature more quickly and, thus, will distort significantly while the body 20 will not distort or bend to any appreciable amount. Thus, during read/write operations, the heating of the heater 32 will cause the head assembly 14 to move closer to the surface 16 of the disc 12 in an appropriate read/write position by disturbing the boundary layer of the air. However, for macro movement of the head assembly 14 during non-read/write operations where the head assembly has to move significant distances, the heater assembly would be preferably turned off, allowing the thermally actuated member 40 to return to ambient, thus causing the planar surface 42 to again become essentially coplanar with the surface 34 and 22, which will return the boundary layer to its undisturbed condition, causing the head assembly 14 to rise farther far from the surface 14 of the disc 12. This allows the head assembly to move freely over greater distances when read/write operations are not being performed and, thus, reduce the potential for deleterious contact.

Figure 7:
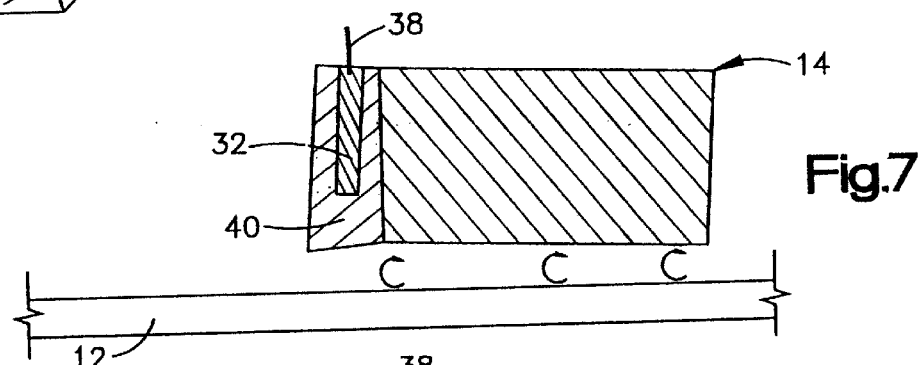
FIG. 7 is a longitudinal, sectional view of another embodiment of a head assembly of a slider in the unactuated condition.
Figure 8:
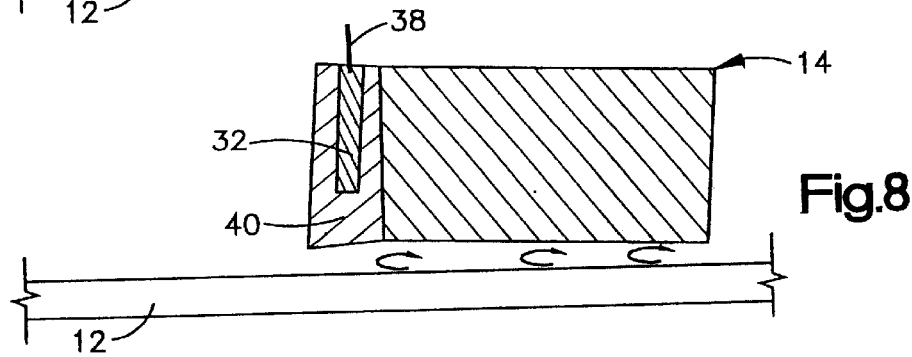
FIG. 8 is a view similar to FIG. 7 of the head assembly in the actuated condition.
Figure 9:
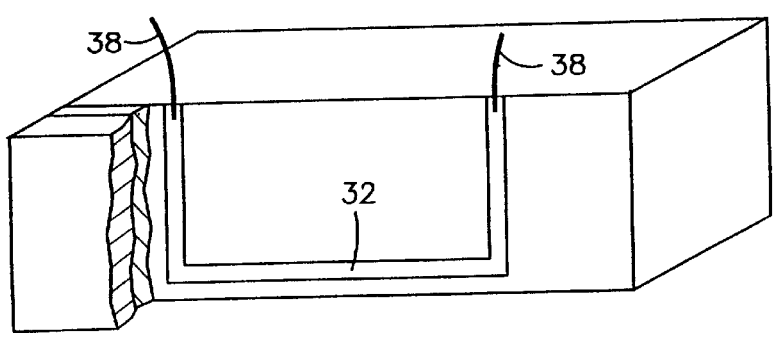
FIG. 9 is a perspective view of the head assembly of FIGS. 7 and 8 with parts broken away for clarity.

Another embodiment of the present invention is shown in FIGS. 7 to 9. In this embodiment, rather than there being a separate insulating material and thermally actuated member, the heater 32 is embedded directly in the thermally actuated material 40 and, when heated, causes the thermally actuated material 40 to bend from the position shown in FIG. 4 to that shown in FIG. 8. Again, in the unactuated and ambient condition, the inner surface 42 of the thermally actuated member 40 is essentially coplanar with planar surface 22 of the body 20 and, when heated in the actuated condition will flex or bend as in the previous embodiment, disturbing the boundary layer of air 52, causing the head assembly 14 to move closer to the surface 16 of the disc 12 to the R/W position.

The invention in its preferred embodiments has been described as a thermally expanding member 40 responsive to an external signal that moves the head closer for R/W operation. However, other materials can be used to respond to an external signal. For example, and not by way of limitation, the member 40 could be formed of a material having a negative coefficient of thermal expansion. In such a case, the member in the unactuated condition would be deformed to cause the head to move to the R/W position, and when actuated would result in a planar surface 42 with the member 40 being coplanar with the surface 34 and 22, thus moving the head assembly 14 to the fly position.

While the invention has been described in conjunction with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. A slider head assembly comprising a slider head for reading/writing (R/W) data on the surface of a rotating disc, which slider head is disposed in spaced relationship to the disc for R/W operations, said slider head assembly including a body portion having an essentially planar surface positioned to co-act with the surface of said disc to form an air bearing surface (ABS) with a proximal end and a distal end, with said proximal end of said head assembly having a R/W element thereat comprising:

said distal end of said assembly having an actuating device having a surface actuatable by an external signal to alter the ABS characteristics and thereby alter the distance of the proximal end of the slider head.

2. The slider head assembly of claim 1 wherein said actuating device is thermally actuated.

3. The slider head assembly of claim 2 wherein the angle of the leading edge of the slider relative to the ABS is thermally deformed.

4. The slider head assembly of claim 2 wherein the distal edge of the actuation device is moved closer to the disc upon heating.

5. The combination of claim 2 wherein the distal edge of the actuation device is moved closer to the disc upon heating.

6. A slider head assembly comprising a slider head for reading/writing (R/W) data on the surface of a rotating disc, which slider head is disposed in spaced relationship to the disc for R/W operations, said slider head assembly including a body portion having an essentially planar surface positioned to co-act with the surface of said disc with a proximal end and a distal end, with said proximal end of said head assembly having a R/W element thereat:

said distal end of said assembly having a thermally actuated device maintained thereon having a surface that is essentially coplanar with said planar surface of said head assembly when at ambient temperatures of the head assembly, and disposed to alter the proximal end distance of the head assembly and the surface of the disc when heated to above said ambient; and a heating element assembly to selectively heat said thermally actuated device.

7. The slider head assembly of claim 6 wherein the angle of the leading edge of the slider relative to the ABS is thermally deformed.

8. The slider head assembly of claim 6 wherein the actuation of the thermally activated device causes a decrease in distance of the trailing edge of the head assembly relative to the surface of the disc.

9. The slider head assembly of claim 6 wherein said heating element assembly includes an inductive heater.

10. The slider head assembly of claim 6 wherein said heating element assembly includes a resistance heater.

11. The slider head assembly of claim 10 wherein said resistance heater is disposed in said thermally actuated device.

12. The slider head assembly as defined in claim 6 wherein said slider head assembly includes an electrically insulating material bonded to said thermally actuated device and said body portion, and wherein said heater is embedded in said electrically insulating material.

13. The slider head assembly of claim 6 wherein the material of said thermally activated device has a coefficient of thermal expansion that is equal to or greater than that of the head assembly.

14. The slider head assembly of claim 13 wherein said thermally activated device is a metal oxide, mixture of metal oxides, mica, silica, polymers, or combination thereof.

15. The slider head assembly of claim 6 wherein said body portion is comprised of aluminum oxide and titanium carbide.

16. The slider head assembly of claim 15 wherein there is about 70% aluminum oxide and 30% titanium carbide.

17. The slider head assembly of claim 6 wherein said body portion is comprised of silicon or a silicon alloy.

18. The slider head assembly of claim 6 wherein the angle of the planar surface and surface of the thermally activated device becomes less than 180° upon heating of the thermally actuated device.

19. The slider head assembly of claim 6 wherein said thermally actuated device includes a leading edge in which mechanical deformation amounts to less than about 20% relative to the distal end and the surface of the disc when heated to above ambient by the heating element.

20. In combination, a rotatable computer data storage disc and a slider head assembly comprising said slider head assembly including a slider head for reading/writing (R/W) data on the surface of said rotatable rotating disc, which slider head is disposed in spaced relationship to the disc for R/W operations, said slider head assembly comprising a body portion having an essentially planar surface positioned to co-act with the surface of said disc to form an air bearing surface (ABS) with a proximal end and a distal end, with said proximal end of said head assembly having a R/W element thereat comprising:

said distal end of said assembly having an actuating device having a surface actuatable by an external signal to alter the ABS characteristics and thereby alter the distance of the proximal head of the slider head and said rotatable disc.

21. The combination of claim 20 wherein said actuating device is thermally actuated.

22. The combination of claim 21 wherein the angle of the leading edge of the slider relative to the ABS is thermally deformed.

23. In combination, a rotatable computer data storage disc and a slider head assembly comprising said slider head assembly, including a slider head for reading/writing (R/W) data on the surface of said rotatable disc, which slider head is disposed in spaced relationship to the disc for R/W operations, said slider head assembly including a body portion having an essentially planar surface positioned to co-act with the surface of said disc with a proximal end and a distal end, with said proximal end of said head assembly having a R/W element thereat:

said distal end of said assembly having a thermally actuated device maintained thereon having a surface that is essentially coplanar with said planar surface of said head assembly when at ambient temperatures of the head assembly, and disposed to alter the proximal end distance of the head assembly and the surface of the disc of the head assembly when heated to above said ambient; and a heating element assembly to selectively heat said thermally actuated device.

24. The combination of claim 23 wherein the angle of the leading edge of the slider relative to the ABS is thermally deformed.

25. The combination of claim 23 wherein the actuation of the thermally activated device causes a decrease in distance of the trailing edge of the head assembly relative to the surface of the disc.

26. The combination of claim 23 wherein said heating element assembly includes an inductive heater.

27. The combination of claim 23 wherein said heating element assembly includes a resistance heater.

28. The slider head assembly of claim 27 wherein said resistance heater is disposed in said thermally actuated device.

* * * * *

UNITED STATES PATENT AND TRADEMARK OFFICE
CERTIFICATE OF CORRECTION

PATENT NO. : 6,775,103 B2
DATED : August 10, 2004
INVENTOR(S) : Soo-Choon Kang and Jeffrey S. Lille It is certified that error appears in the above-identified patent and that said Letters Patent is hereby corrected as shown below:

<u>Column 1,</u>
Line 14, after "read/write" change "(RIW)" to -- (R/W) --.

Signed and Sealed this

Twenty-third Day of November, 2004

JON W. DUDAS
*Director of the United States Patent and Trademark Office*